(12) United States Patent
Cheng et al.

(10) Patent No.: US 12,469,533 B2
(45) Date of Patent: Nov. 11, 2025

(54) CALIBRATION APPARATUS AND CALIBRATION METHOD OF MEMORY DEVICE WITH STRONG-ARM COMPARATOR

(71) Applicant: MACRONIX International Co., Ltd., Hsinchu (TW)

(72) Inventors: Wei-Yi Cheng, Tainan (TW); Su-Chueh Lo, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 153 days.

(21) Appl. No.: 18/475,246

(22) Filed: Sep. 27, 2023

(65) Prior Publication Data

US 2025/0104750 A1  Mar. 27, 2025

(51) Int. Cl.
*G11C 7/22* (2006.01)
*G11C 7/10* (2006.01)

(52) U.S. Cl.
CPC ............ *G11C 7/222* (2013.01); *G11C 7/1039* (2013.01); *G11C 7/1063* (2013.01); *G11C 2207/2254* (2013.01)

(58) Field of Classification Search
CPC ..... G11C 7/222; G11C 7/1039; G11C 7/1063; G11C 2207/2254
See application file for complete search history.

(56) References Cited

U.S. PATENT DOCUMENTS

| | | | |
|---|---|---|---|
| 9,871,517 B1 * | 1/2018 | Cheng | H03K 19/23 |
| 10,439,612 B1 * | 10/2019 | Johnson | G11C 29/50008 |
| 2018/0091148 A1 | 3/2018 | Mohd Yusof et al. | |

FOREIGN PATENT DOCUMENTS

| | | |
|---|---|---|
| CN | 112636717 | 4/2021 |
| CN | 115273952 | 11/2022 |
| EP | 2631911 | 2/2017 |
| TW | 201740376 | 11/2017 |
| TW | 202305799 | 2/2023 |

OTHER PUBLICATIONS

Behzad Razavi, "The StrongARM Latch", A Circuit for All Seasons—IEEE Solid-State Circuits Magazine, Jun. 2015, pp. 12-17.
"Office Action of Taiwan Counterpart Application", issued on Jul. 30, 2024, pp. 1-5.

* cited by examiner

Primary Examiner — Sultana Begum
(74) Attorney, Agent, or Firm — J.C. PATENTS (57) ABSTRACT

A calibration apparatus of a memory device and a calibration method thereof are provided. The memory device is a 3D NAND flash with high capacity and high performance. The calibration apparatus includes an impedance, a strong-arm comparator, a logic circuit, and a calibration controller. The impedance is configured to generate a comparison voltage. The strong-arm comparator includes a differential input pair and a latch. The differential input pair compares a reference voltage and the comparison voltage to produce a comparison result. The latch latches the comparison result and generates a latch signal and an inverted latch signal accordingly. The logic circuit generates a comparison result signal according to the latch signal and the inverted latch signal. The calibration controller implements an impedance calibration in the memory device according to the comparison result signal.

20 Claims, 9 Drawing Sheets

| State | ZQS[n:0] | | | | | |
|---|---|---|---|---|---|---|
| | n | n−1 | ··· | 2 | 1 | 0 |
| State 1 | 0 | 0 | ··· | 0 | 1 | 1 |
| State 2 | 0 | 0 | ··· | 0 | 0 | 0 |
| State 3 | 0 | 0 | ··· | 0 | 0 | 1 |
| State 4 | 0 | 0 | ··· | 0 | 1 | 0 |
| ··· | ··· | ··· | | ··· | ··· | ··· |
| State M | 1 | 1 | ··· | 1 | 1 | 1 |

| State | ZQS[n:0] | | | | | |
|---|---|---|---|---|---|---|
| | n | n−1 | ··· | 2 | 1 | 0 |
| State 1 | 1 | 0 | ··· | 2 | 1 | 0 |
| State 2 | 0 | 1 | ··· | 0 | 0 | 0 |
| ··· | ··· | ··· | | ··· | ··· | ··· |
| State M−1 | 0 | 0 | ··· | 1 | 1 | 0 |
| State M | 0 | 0 | ··· | 0 | 0 | 1 |

CALIBRATION APPARATUS AND CALIBRATION METHOD OF MEMORY DEVICE WITH STRONG-ARM COMPARATOR

BACKGROUND

Technical Field

The disclosure relates to an impedance calibration technology of a memory device, and in particular, to a calibration apparatus of a memory device and a calibration method thereof.

Description of Related Art

High-capacity and high-performance integrated circuit memory including 3D NAND flash is in continuous development. It is hoped that three-dimensional stacking technology and multi-level cells (MLC) can shrink the size of the cell and increase the data storage density, so that the speed of data access and transmission can be increased.

On the other hand, as the operating speed of the electronic device increases, the swing width of the signal transmitted between memory devices in the electronic device can be correspondingly reduced, thereby reducing the delay time spent in transmitting the signal. However, as the swing width of the signal is reduced, the signal transmission will be greatly affected by external noise, and the signal reflection at the data transmission end will increase due to the impedance mismatch between the transmission paths, making it difficult to transmit data at high speed, and reducing the signal integrity and affecting the signal transmission quality. The impedance mismatch can be caused by changes in the semiconductor manufacturing process, supply voltage, and operating temperature (PVT). Therefore, calibrating the impedance in the data transmission path (such as ZQ calibration) can solve the problem of reduced signal integrity due to the impedance mismatch during the high-speed data transmission.

SUMMARY

The disclosure provides an impedance calibration technology of a memory device, which can reduce the error rate of impedance calibration and improve the signal integrity in the memory device.

A calibration apparatus of a memory device according to the embodiment of the disclosure includes an impedance, a strong-arm comparator, a logic circuit, and a calibration controller. The impedance is configured to generate a comparison voltage. The strong-arm comparator includes a non-inverting input end and an inverting input end. The non-inverting input end is received a reference voltage. The inverting input end is received the comparison voltage. The strong-arm comparator compares the reference voltage and the comparison voltage to generate a comparison result, latches the comparison result and correspondingly generates a latch signal and an inverted latch signal. The logic circuit is coupled to the strong-arm comparator. The logic circuit generates a comparison result signal according to the latch signal and the inverted latch signal. The calibration controller implements impedance calibration in the memory device according to the comparison result signal.

A calibration method of a memory device according to the embodiment of the disclosure includes following steps: generating a comparison voltage according to an impedance; comparing the comparison voltage and the reference voltage to generate a comparison result; latching the comparison result and correspondingly generating a latch signal and an inverted latch signal; generating a comparison result signal according to the latch signal and the inverted latch signal; and generating a calibration signal according to the comparison result signal to implement impedance calibration of the memory device.

Based on the above, the calibration apparatus of the memory device and the calibration method thereof according to the embodiment of the disclosure reduces the delay time in comparing the comparison signal and the reference signal by changing the circuit structure (for example, replacement of the original comparison circuit with a strong-arm comparator, structural adjustment of the logic circuit) to allow subsequent circuits for impedance calibration (such as a controller that implements ZQ calibration) to have sufficient timing budget and calculation margin, thereby reducing the error rate of impedance calibration and improving the signal integrity in the memory device.

DESCRIPTION OF THE EMBODIMENTS

Figure 1:
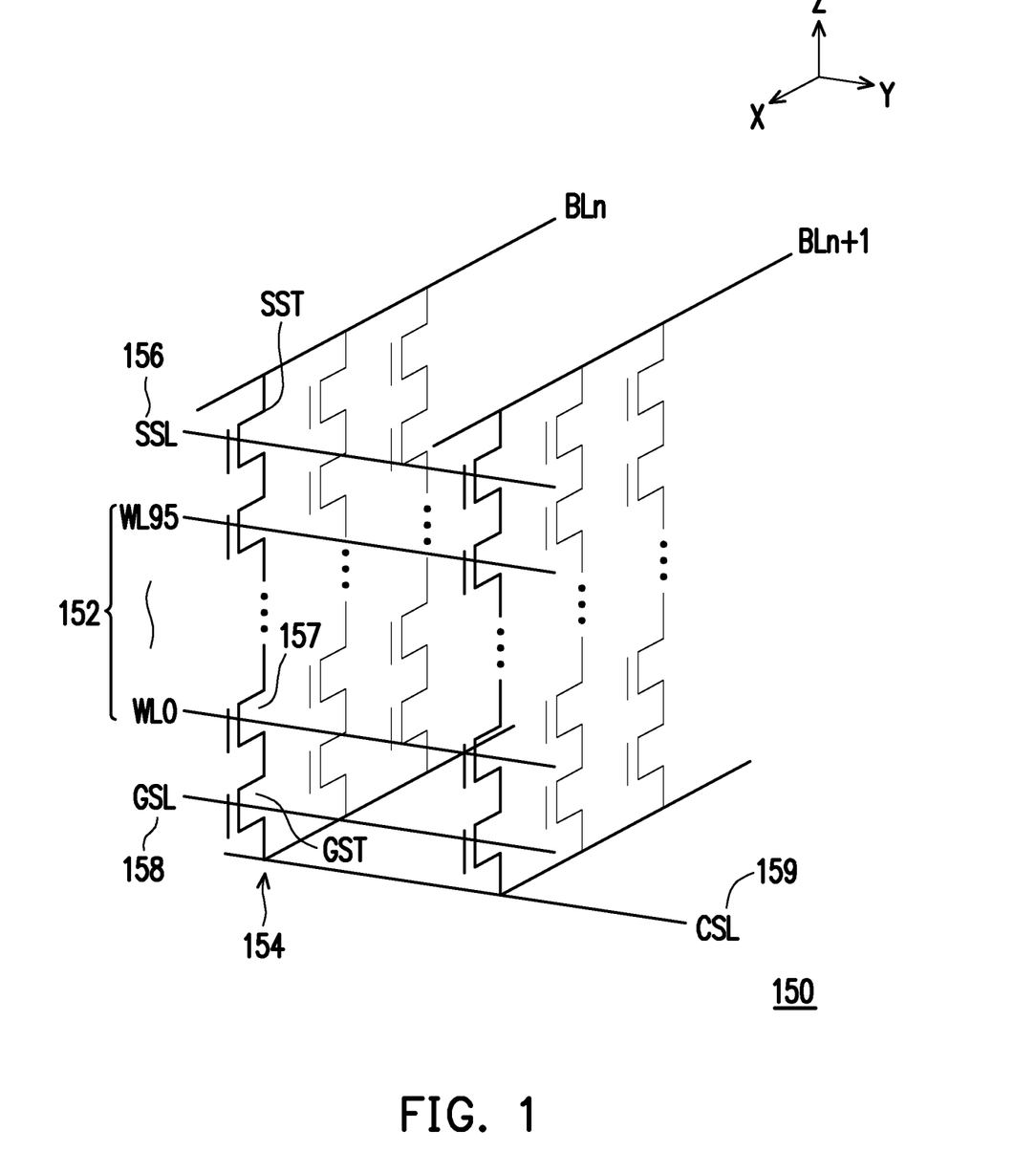
FIG. 1 is a schematic structural diagram of a memory block in a three-dimensional memory chip according to an embodiment of the disclosure.

FIG. 1 is a schematic structural diagram of a memory block 150 in a three-dimensional memory chip according to an embodiment of the disclosure. The memory block 150 may be part of a 3D NAND flash memory with high capacity and high performance. A plurality of memory cells in the memory block 150 are configured in three dimensions, for example, the XYZ coordinate system. Taking a memory cell 157 as an example, the memory cell 157 is coupled to a corresponding word line WL0 and a corresponding bit line BL. Word lines (e.g., word lines WL0 to WL95) formed with conductive layers or word line layers and the plurality of memory cells coupled thereto form a plurality of pages 152. In other words, the memory cells in the memory block 150 are divided into the plurality of pages 152. Each page of the pages 152 can be, for example, a layer of memory cells in the XY plane, and the memory cells on the same layer (same page) are coupled to a same word line (e.g., the word line WL0 or WL95) and obtain corresponding word line voltages. The memory cells on different layer (different page) are coupled to different word lines. Each page of the pages 152 can be connected to a corresponding contact point in the drive circuit, for example to the X decoder (or scan driver). Each line has a corresponding voltage driver, and the voltage drivers can be controlled by a memory controller (not shown) or a corresponding hardware. The plurality of memory cells in a memory cell string 154 belong to different pages.

The memory cell string 154 includes the plurality of memory cells connected in series vertically along the Z direction. The memory cell is configured as a string select transistor SST coupled to a string select line SSL 156. The memory cell may also be configured as a ground select transistor GST coupled to a ground select line GSL 158. The memory cell string 154 is connected to one or more drivers, such as data drivers. The memory cell string 154 including the memory cell 157 is connected to a common source line CSL 159 via the ground select transistor GST. The string select line SSL 156 may be a conductive line or a conductive layer formed on the top page of the pages 152 (or word line layer). The memory block 150 may include a plurality of string select lines SSLs 156 provided on the top page of the pages 152. The ground select line GSL 158 may be a conductive line or a conductive layer formed on the bottom page of the pages 152 (or word line layer). The common source line CSL 159 may be a conductive layer or a plurality of conductive lines formed on the substrate of the three-dimensional memory chip. Several virtual lines or corresponding layers (not shown) may also be disposed between the string select line SSL 156 and the uppermost page of the pages 152, or between the ground select line GSL 158 and the lowermost page of the pages 152.

On the other hand, in order to improve the signal integrity and enhance the strength of the output signal, whether it is the NAND flash memory device of FIG. 1 or a double data rate synchronous dynamic random access memory (DDR SDRAM), the memory device can be provided with termination resistors and corresponding adjustment drivers to calibrate the impedance on the data transmission path (e.g., ZQ calibration), thereby reducing the impedance mismatch caused by changes in the semiconductor manufacturing process, supply voltage, and operating temperature (PVT) so as to maintain signal integrity.

Figure 2:
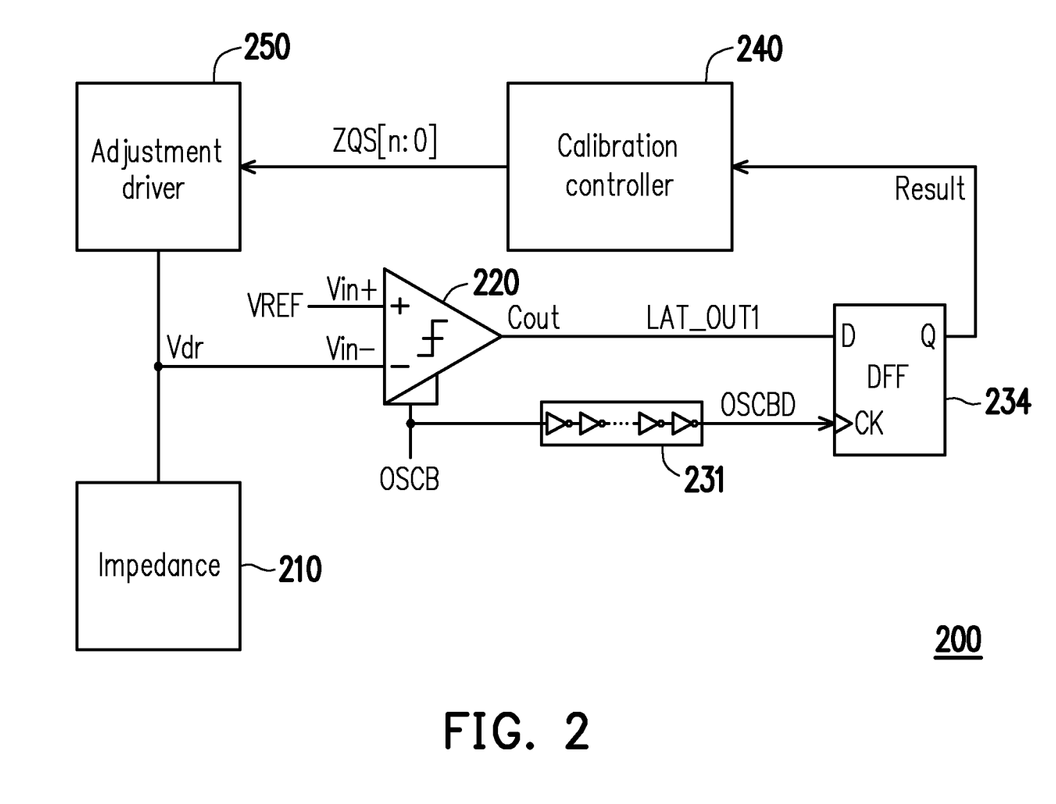
FIG. 2 is a circuit block diagram of a calibration apparatus of a memory device according to a first embodiment of the disclosure.

FIG. 2 is a circuit block diagram of a calibration apparatus 200 of a memory device according to a first embodiment of the disclosure. The calibration apparatus 200 of FIG. 2 includes an impedance 210, a comparator 220, a delay element 231, a data flip-flop (DFF) 234, a calibration controller 240, and an adjustment driver 250. The impedance 210 can be referred to as a reference impedance, which generates a comparison voltage Vdr by the current provided by the adjustment driver. The comparator 220 has a non-inverting input end Vin+, an inverting input end Vin−, and an output end Cout. The non-inverting input end Vin+ receives a reference voltage VREF, and the inverting input end Vin− receives the comparison voltage Vdr. The comparator 220 uses an inverted clock signal OSCB, which is opposite to a clock signal OSC, as the clock signal of the comparator 220 to enable the comparator 220 to implement its function. The comparator 220 is used for comparing the reference voltage VREF and the comparison voltage Vdr to generate a comparison result LAT_OUT1 at the output end Cout. The calibration apparatus 200 of FIG. 2 also includes a reference voltage generator, which is controlled by a calibration signal ZQS[n:0] to adjust the voltage value of the reference voltage VREF accordingly.

Since the comparator 220 needs a period of time to compare the reference voltage VREF and the comparison voltage Vdr, the comparison result LAT_OUT1 cannot be generated immediately to the DFF 234. Therefore, the delay element 231 will delay the inverted clock signal OSCB for a predetermined time to generate a delayed clock signal OSCBD, and the DFF 234 uses the delayed clock signal OSCBD as the clock signal of the DFF 234 to enable the DFF 234 to implement its function.

The calibration controller 240 correspondingly implements impedance calibration (e.g., ZQ calibration) in the memory device according to a comparison result signal Result generated by the DFF 234. Specifically, the calibration controller 240 correspondingly generates the calibration signal ZQS[n:0] according to the comparison result signal Result to implement impedance calibration. The calibration signal ZQS[n:0] can represent the strength of the ZQ calibration and can be used as a signal provided to the adjustment driver 250. The adjustment driver 250 coupled to the impedance 210 correspondingly generates an adjusted current according to the calibration signal ZQS[n:0]. The impedance 210 generates the comparison voltage Vdr by the adjusted current generated by the adjustment driver 250. The comparator 220, the delay element 231, the DFF 234, the calibration controller 240, and the adjustment driver 250 in the calibration apparatus 200 are disposed in the chip, and the impedance 210 is disposed outside the chip and coupled to a resistor or an impedance transistor on a specific pin of the chip (for example, ZQ pin). The foregoing resistor can be a passive resistor.

The processing time elapsed when the comparator 220 compares the reference voltage VREF and the comparison voltage Vdr (herein referred to as a comparison delay) will correspondingly squeeze the processing time of the calibration controller 240 to implement impedance calibration. In other words, the calibration controller 240 will not have sufficient timing budget, thereby affecting the accuracy of the impedance calibration.

Figure 3:
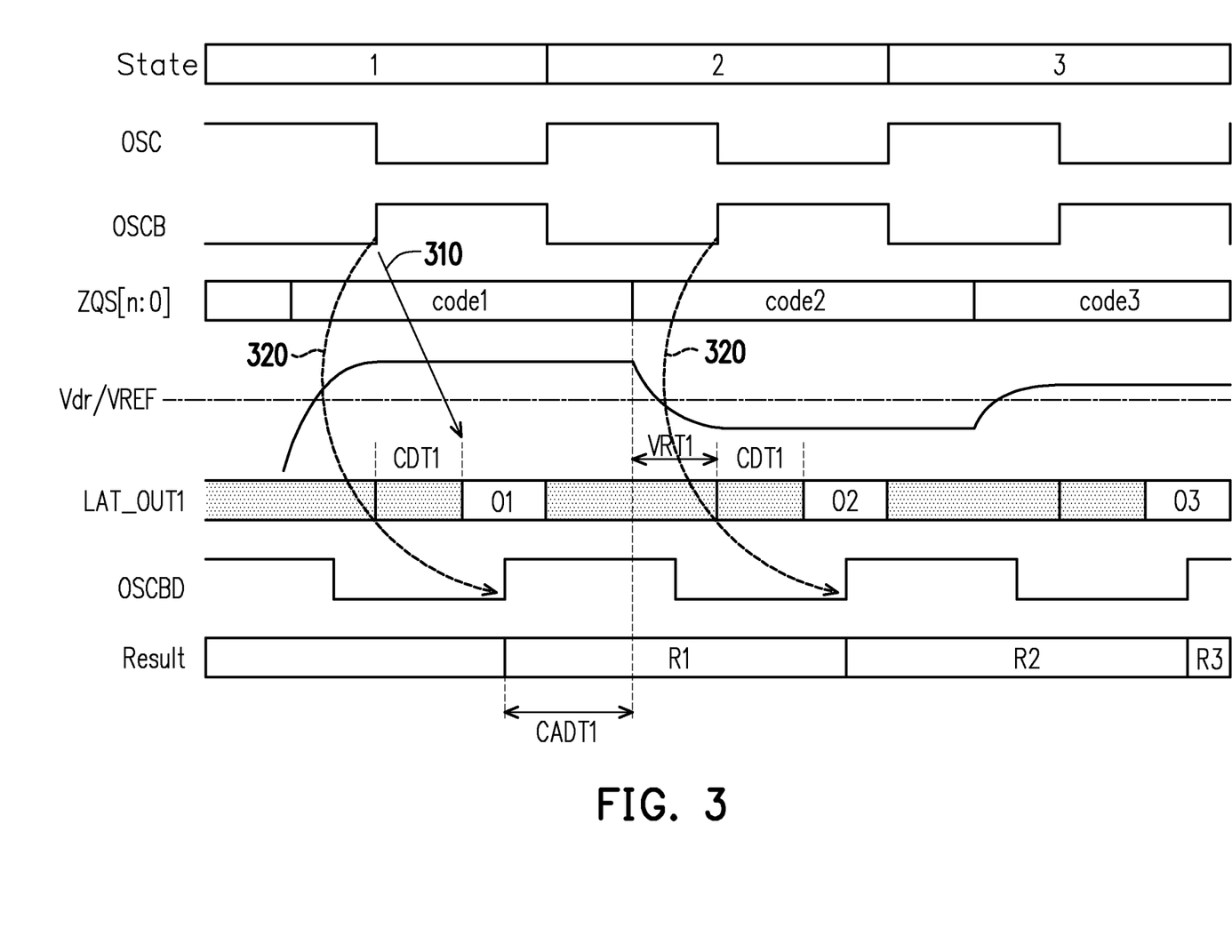
FIG. 3 is a timing diagram of various signals of the calibration apparatus of FIG. 2.

FIG. 3 is a timing diagram of various signals of the calibration apparatus 200 of FIG. 2. Each state 1 to state 3 represents a ZQ calibration. The mark 'Vdr/VREF' in FIG. 3 is to represent the comparison voltage Vdr (the corresponding solid line waveform of 'Vdr/VREF' in FIG. 3) and the reference voltage VREF (the corresponding dotted line of of 'Vdr/VREF' in FIG. 3). It can be seen from the arrow 310 of FIG. 3 that the rising edge time point of the clock signal (inverted clock signal OSCB) corresponding to the comparator 220 to the time point when the comparator 220 generates a first data O1 in the comparison result LAT_OUT1 is a comparison delay CDT1 as described above. In order to make the operation timing of DFF 234 in FIG. 2 correct, as shown by the arrow 320, the timer in delay element 231 is delayed by a predetermined time according to the inverted clock signal OSCB to generate the delayed clock signal OSCBD, which can prevent the DFF 234 from latching to an incorrect result due to the slower output of the comparator 220. As a result, the calibration controller 240 of FIG. 2 can only calculate a code code2 in the corresponding calibration signal ZQS[n:0] within a period of a calculation delay CADT1, and in the next state (for example, state 2), the calibration controller 240 provides the calibration signal ZQS[n:0] with the code code2 to the adjustment driver 250, so that the calibration controller 240 can adjust the voltage value of the reference voltage VREF during a reference voltage adjustment time VRT1 and continue the next ZQ calibration in state 2. The data O1, O2, and O3 in the comparison result LAT_OUT1 correspond to the data calculated in different states. The data R1, R2, and R3 in the comparison result signal Result correspond to the data calculated in different states.

It can be seen from FIG. 3 that the time point at which the comparator 220 generates the first data O1 in the comparison result LAT_OUT1 is delayed due to the comparison delay CDT1, which causes the calibration controller 240 to shorten the calculation delay CADT1 when implementing ZQ calibration, and causes the update time of the calibration signal ZQS[n:0] and the reference voltage adjustment time VRT1 to be correspondingly shortened. If the calibration signal ZQS[n:0] is updated too late, it will affect the establishment of the reference voltage VREF in the next state and affect the comparator in the next state.

In a second embodiment of the disclosure, the comparator 220 of FIG. 2 is replaced by a strong-arm comparator including a differential input pair and a latch, and the delay element 231 consisting of a plurality of inverters is replaced by an NAND gate in a logic circuit, so that the calibration apparatus can be allowed to have more timing budget for establishing the reference voltage VREF in the next state, and the timing budget for the calibration controller 240 to implement and calculate ZQ calibration can be extended.

Figure 4:
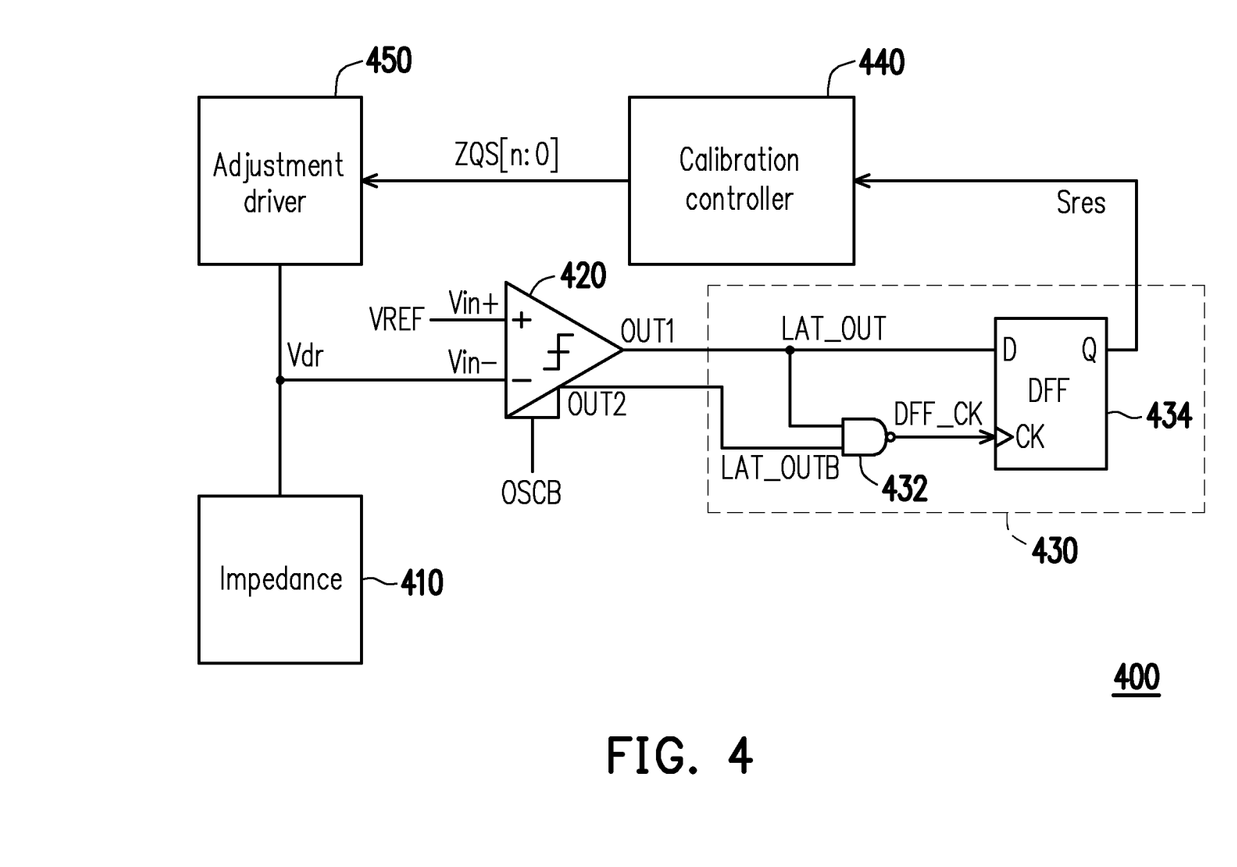
FIG. 4 is a circuit block diagram of a calibration apparatus of a memory device according to a second embodiment of the disclosure.

FIG. 4 is a circuit block diagram of a calibration apparatus 400 of a memory device according to a second embodiment of the disclosure. The main difference between FIG. 2 and FIG. 4 is that the calibration apparatus 400 replaces the comparator 220 of FIG. 2 with a strong-arm comparator 420 of FIG. 4, and the calibration apparatus 400 uses an NAND gate 432 in a logic circuit 430 to replace the delay element consisting of a plurality of inverters. In detail, the calibration apparatus 400 consists of an impedance 410, a strong-arm comparator 420, a logic circuit 430, a calibration controller 440, and an adjustment driver 450. The functions of the impedance 410, the calibration controller 440, and the adjustment driver 450 are the same as the functions of the corresponding components of FIG. 2.

Figure 5:
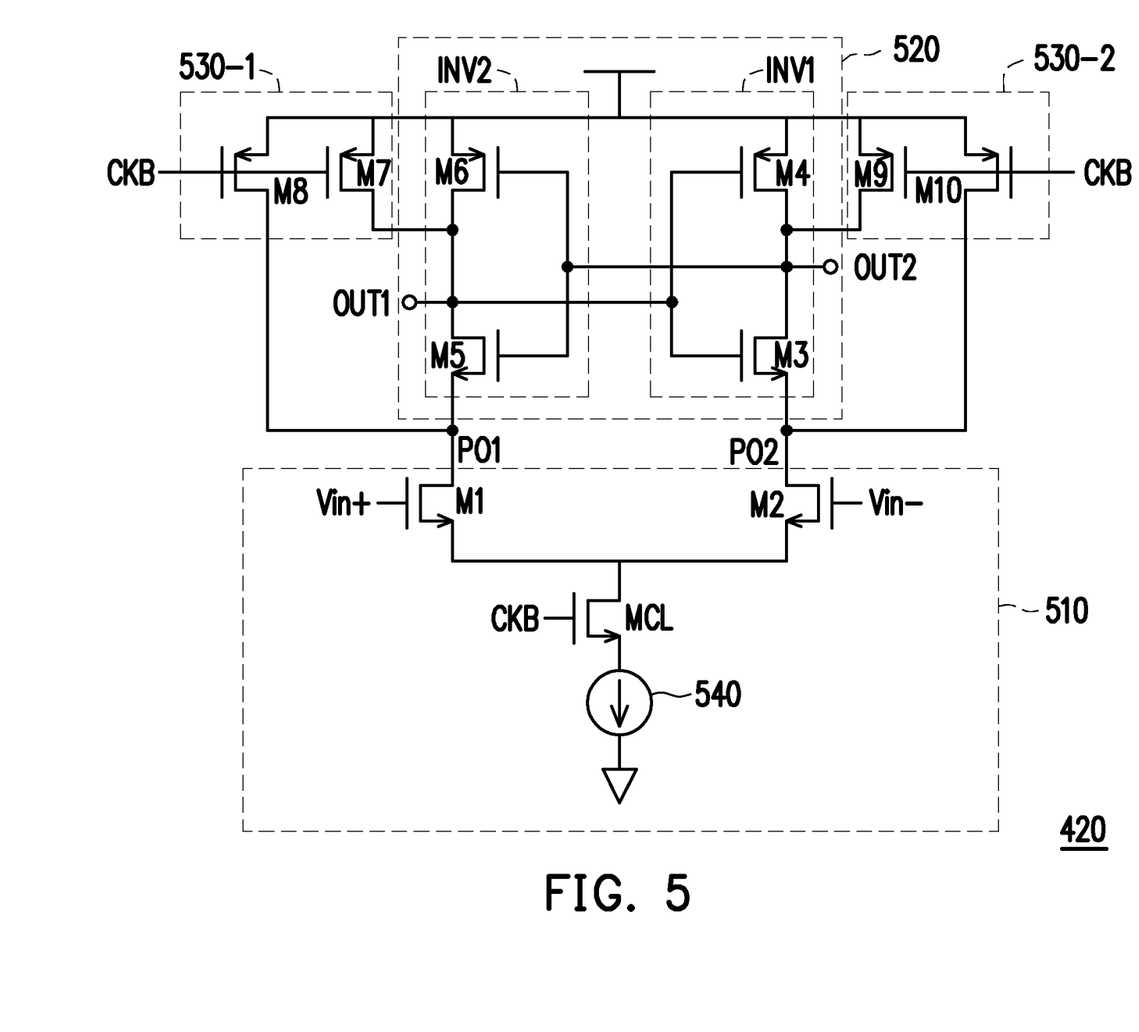
FIG. 5 is a detailed circuit diagram of the strong-arm comparator of FIG. 4.

A non-inverting input end Vin+ of the strong-arm comparator 420 receives the reference voltage VREF, and an inverting input end Vin− of the strong-arm comparator 420 receives the comparison voltage Vdr. The strong-arm comparator 420 generates a latch signal LAT_OUT and an inverted latch signal LAT_OUTB respectively at a first output end OUT1 and a second output end OUT2 of the strong-arm comparator 420 by comparing the reference voltage VREF and the comparison voltage Vdr. The detailed circuit structure of the strong-arm comparator 420 is shown in FIG. 5 and the corresponding description.

The logic circuit 430 is coupled to the strong-arm comparator 420. The logic circuit 430 generates a comparison result signal Sres according to the latch signal LAT_OUT and the inverted latch signal LAT_OUTB. In detail, the logic circuit 430 mainly includes an NAND gate 432 and a DFF 434. A first input end of the NAND gate 432 receives the latch signal LAT_OUT, and a second input end of the NAND gate 432 receives the inverted latch signal LAT_OUTB.

An output end of the NAND gate 432 generates a flip-flop clock signal DFF_CK. Therefore, when the polarity of the latch signal LAT_OUT or the inverted latch signal LAT_OUTB is reversed, the flip-flop clock signal DFF_CK will trigger the DFF 434.

The DFF 434 includes a data input end D, a clock receiving end CK, and a data output end Q. The data input end D receives the latch signal LAT_OUT, and the clock receiving end CK receives the flip-flop clock signal DFF_CK. The DFF 434 generates the comparison result signal Sres at the data output end Q according to the latch signal LAT_OUT and the flip-flop clock signal DFF_CK. The calibration controller 440 generates the calibration signal ZQS[n:0] according to the comparison result signal Sres. The calibration signal ZQS[n:0] is configured to be provided to the adjustment driver 450 and to dispose the reference voltage VREF through the reference voltage generator.

FIG. 5 is a detailed circuit diagram of the strong-arm comparator 420 of FIG. 4. The strong-arm comparator 420 of FIG. 5 mainly includes a differential input pair 510 and a latch 520. The differential input pair 510 includes a first input end and a second input end. The first input end serves as the non-inverting input end Vin+ of the strong-arm comparator 420 to receive the reference voltage VREF. The second input end serves as the inverting input end Vin− of the strong-arm comparator 420 to receive the comparison voltage Vdr. The differential input pair 510 compares the reference voltage VREF and the comparison voltage Vdr to generate a comparison result.

In detail, the differential input pair 510 includes a first transistor M1 and a second transistor M2. A control end of the first transistor M1 is coupled to the non-inverting input end Vin+ of the strong-arm comparator 420. A first end of the first transistor M1 serves as a first output end PO1 of the differential input pair 510. A control end of the transistor M2 is coupled to the inverting input end Vin− of the strong-arm comparator 420. The first end of the first transistor M2 serves as a second output end PO2 of the differential input pair 510. A second end of the second transistor M1 is coupled to the second end of the second transistor M2. The differential input pair 510 also includes a control transistor MCL and a current source 540. A first end of the control transistor MCL is coupled to the second end of the first transistor M1 and the second end of the second transistor M2. A control end of the control transistor MCL receives a clock signal CKB. The current source 540 is coupled to a second end of the control transistor MCL. The transistors M1, M2, and MCL in the embodiment are all N-type transistors.

The latch 520 of FIG. 5 latches the comparison result provided by the differential input pair 510 from the first output end PO1 and the second output end PO2 of the differential input pair 510 and correspondingly generates the latch signal LAT_OUT and the inverted latch signal LAT_OUTB at the first output end OUT1 and the second output end OUT2. In detail, the latch 520 of FIG. 5 includes a first inverter INV1 and a second inverter INV2. An input end of the first inverter INV1 is coupled to the first output end OUT1 of the strong-arm comparator 420. An output end of the first inverter INV1 is coupled to the second output end OUT2 of the strong-arm comparator 420. A ground end of the first inverter INV1 is coupled to the second output end PO2 of the differential input pair 510. The first output end OUT1 and the second output end OUT2 are configured to generate the latch signal LAT_OUT and the inverted latch signal LAT_OUTB respectively. An input end of the second inverter INV2 is coupled to the second output end OUT2 of the strong-arm comparator 420. An output end of the second inverter INV2 is coupled to the first output end OUT1 of the strong-arm comparator 420. A ground end of the second inverter INV2 is coupled to the first output end PO1 of the differential input pair 510.

The first inverter INV1 includes transistors M3 and M4. A control end of the transistor M3 is coupled to the first output end OUT1 of the strong-arm comparator 420. A first end of the transistor M3 is coupled to the second output end OUT2 of the strong-arm comparator 420. A second end of the transistor M3 is coupled to the first output end PO1 of the differential input pair 510. A control end of the transistor M4 is coupled to the first output end OUT1 of the strong-arm comparator 420. A first end of the transistor M4 is coupled to a system voltage end VDD. A second end of the transistor M4 is coupled to the second output end OUT2 of the strong-arm comparator 420.

The second inverter INV2 includes transistors M5 and M6. A control end of the transistor M5 is coupled to the second output end OUT2 of the strong-arm comparator 420. A first end of the transistor M5 is coupled to the first output end OUT1 of the strong-arm comparator 420. A second end of the transistor M5 is coupled to the first output end POI of the differential input pair 510. A control end of the transistor M6 is coupled to the second output end OUT2 of the strong-arm comparator 420. A first end of the transistor M6 is coupled to the system voltage end VDD. A second end of the transistor M6 is coupled to the first output end OUT1 of the strong-arm comparator 420. Transistors M3 and M5 are both N-type transistors, and transistors M4 and M6 are both P-type transistors.

The strong-arm comparator 420 also includes reset circuits 530-1 and 530-2. The reset circuits 530-1 and 530-2 are coupled to the differential input pair 510 and the latch 520. The reset circuits 530-1 and 530-2 reset the first output end PO1 and the second output end PO2 of the differential input pair 510 and reset the latch 520 according to the clock signal CKB (i.e, the inverted clock signal OSCB of FIG. 4).

In detail, the reset circuit 530-1 includes transistors M7 and M8. A control end of the transistor M7 receives the clock signal CKB. A first end of the transistor M7 is coupled to the system voltage end VDD. A second end of the transistor M7 is coupled to the first output end OUT1 of the strong-arm comparator 420. A control end of the transistor M8 receives the clock signal CKB. A first end of the transistor M8 is coupled to the system voltage end VDD. A second end of the transistor M8 is coupled to the first output end PO1 of the differential input pair 510. The reset circuit 530-2 includes transistors M9 and M10. A control end of the transistor M9 receives the clock signal. A first end of the transistor M9 is coupled to the system voltage end VDD. A second end of the transistor M9 is coupled to the second output end OUT2 of the strong-arm comparator 420. A control end of the transistor M10 receives the clock signal CKB. A first end of the transistor M10 is coupled to the system voltage end VDD. A second end of the transistor M10 is coupled to the second output end PO2 of the differential input pair 510. Transistors M7 to M10 are all P-type transistors.

When the clock signal CKB is enabled, both ends of the transistors M7 to M10 in the reset circuits 530-1 and 530-2 of FIG. 5 are turned on, so that the potentials on the first output end OUT1 and the second output end OUT2 of the strong-arm comparator 420 and the potentials on the first output end PO1 and the second output end PO2 of the differential input pair 510 are all raised to the same potential as the system voltage end VDD to realize the resetting of the differential input pair 510 and the latch 520.

Figure 6:
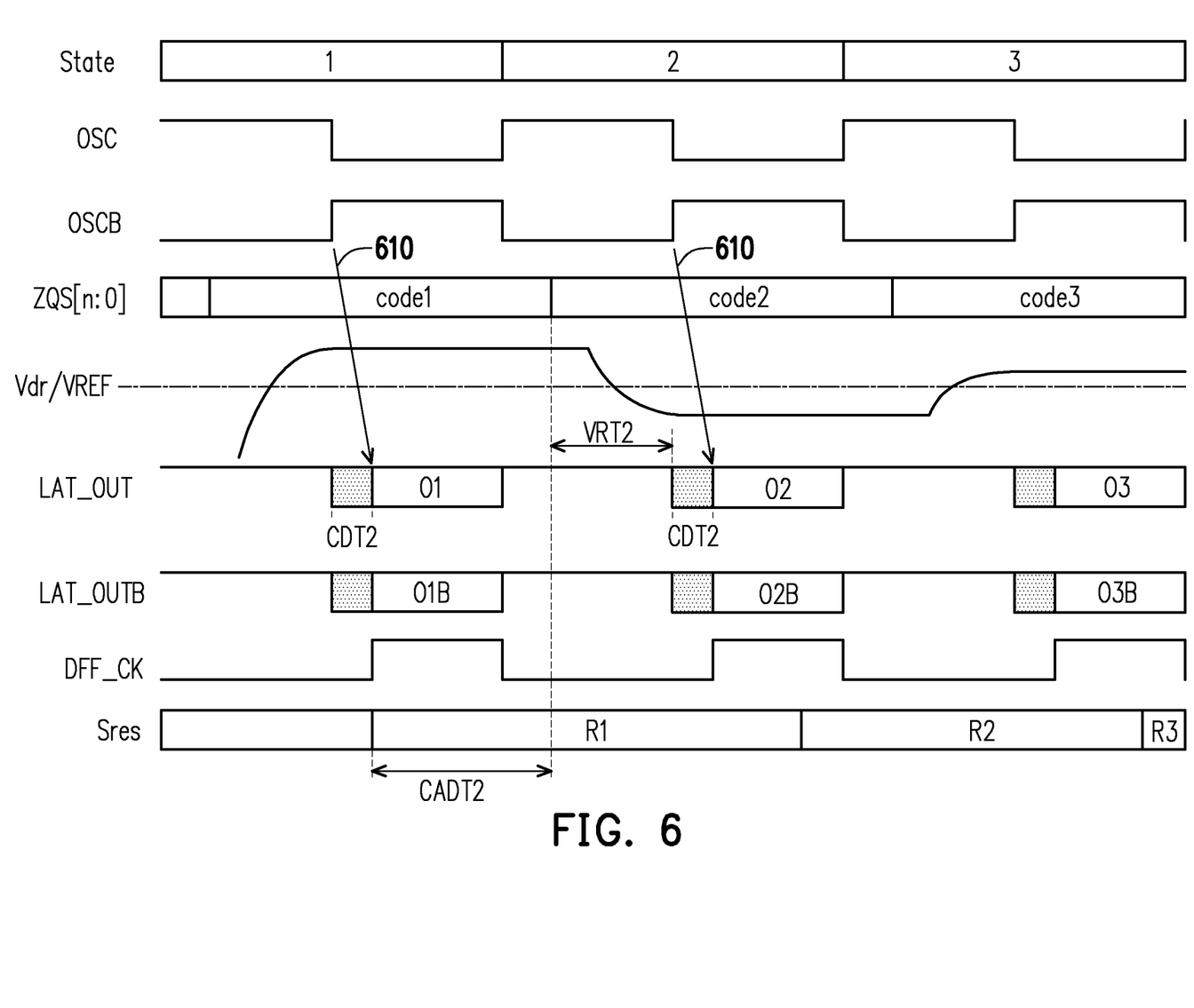
FIG. 6 is a timing diagram of various signals of the calibration apparatus of FIG. 4.

FIG. 6 is a timing diagram of various signals of the calibration apparatus 400 of FIG. 4. The mark 'Vdr/VREF' in FIG. 6 is to represent the comparison voltage Vdr (the corresponding solid line waveform of 'Vdr/VREF' in FIG. 6) and the reference voltage VREF (the corresponding dotted line of of 'Vdr/VREF' in FIG. 6). Each state 1 to state 3 represents a ZQ calibration. It can be seen from the arrow 610 of FIG. 6 that the rising edge time point of the clock signal (inverted clock signal OSCB) corresponding to the strong-arm comparator 420 to the time point when the strong-arm comparator 420 generates the first data O3 in the comparison result LAT_OUT1 is a comparison delay CDT2.

On the other hand, when the polarities of the latch signal LAT_OUT and the inverted latch signal LAT_OUTB are different, the flip-flop clock signal DFF_CK will be switched from disabled to enabled due to the NAND gate 432 of FIG. 4. The DFF 434 provides the comparison result signal Sres to the calibration controller 440 of FIG. 4, so that the calibration controller 440 of FIG. 4 can calculate the code code2 in the corresponding calibration signal ZQS[n:0] within the time period of a calculation delay CADT2, and in the next state (for example, state 2), the calibration controller 440 provides the calibration signal ZQS[n:0] with the code code2 to the adjustment driver 450. The calibration controller 440 can adjust the voltage value of the reference voltage VREF during a reference voltage adjustment time VRT2 and continue the next ZQ calibration in state 2.

Comparing FIG. 3 and FIG. 6, the time length of the comparison delay CDT2 of FIG. 6 is significantly shorter than the time length of the comparison delay CDT1 of FIG. 3. Moreover, the calculation delay CADT2 of the calibration controller 440 of FIG. 6 during ZQ calibration is significantly longer than the calculation delay CADT1 of FIG. 3, and the reference voltage adjustment time VRT2 of FIG. 6 is significantly longer than the reference voltage adjustment time VRT1 of FIG. 2. In this way, the calibration controller 440 of FIG. 6 can have more time to calculate the ZQ calibration and adjust the reference voltage VREF so as to avoid calibration errors.

Figure 7:
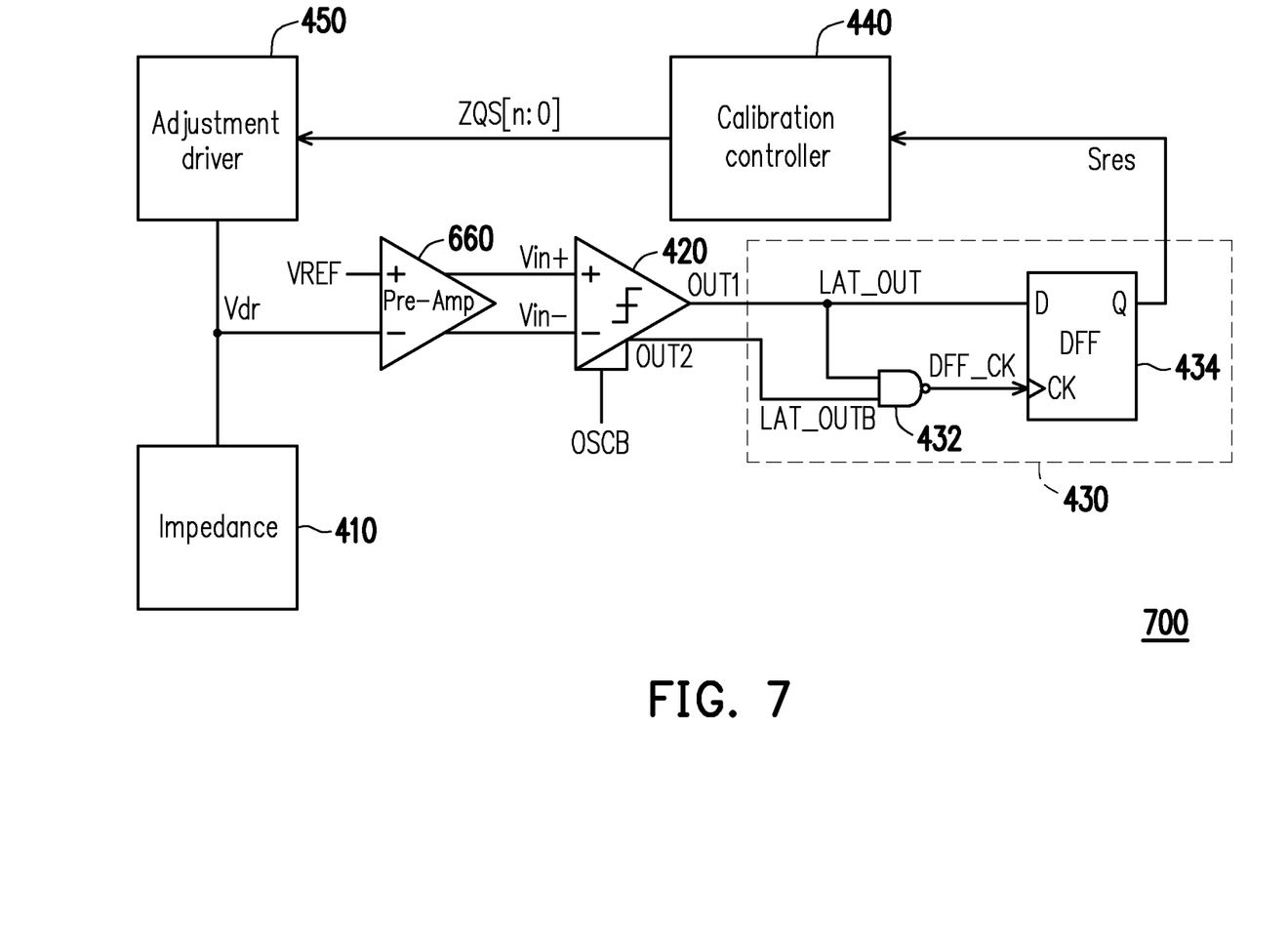
FIG. 7 is a circuit block diagram of a calibration apparatus of a memory device according to a third embodiment of the disclosure.

FIG. 7 is a circuit block diagram of a calibration apparatus 700 of a memory device according to a third embodiment of the disclosure. Compared with the second embodiment of FIG. 6, provided that the circuit design conditions are met, the calibration apparatus 700 of FIG. 7 also includes a preamplifier 660. The preamplifier 660 is coupled between the strong-arm comparator 420 and the impedance 410. The non-inverting input end Vin+ of the strong-arm comparator 420 receives the reference voltage VREF through the preamplifier 660. The inverting input end Vin-of the strong-arm comparator 420 receives the comparison voltage Vdr through the preamplifier 660. Specifically, the two input ends of the preamplifier 660 receive the reference voltage VREF and the comparison voltage Vdr respectively, and the two output ends of the preamplifier 660 are coupled to the non-inverting input end Vin+ and the inverting input end Vin− of the strong-arm comparator 420 respectively to amplify the difference between the reference voltage VREF and the comparison voltage Vdr.

Figure 8A:
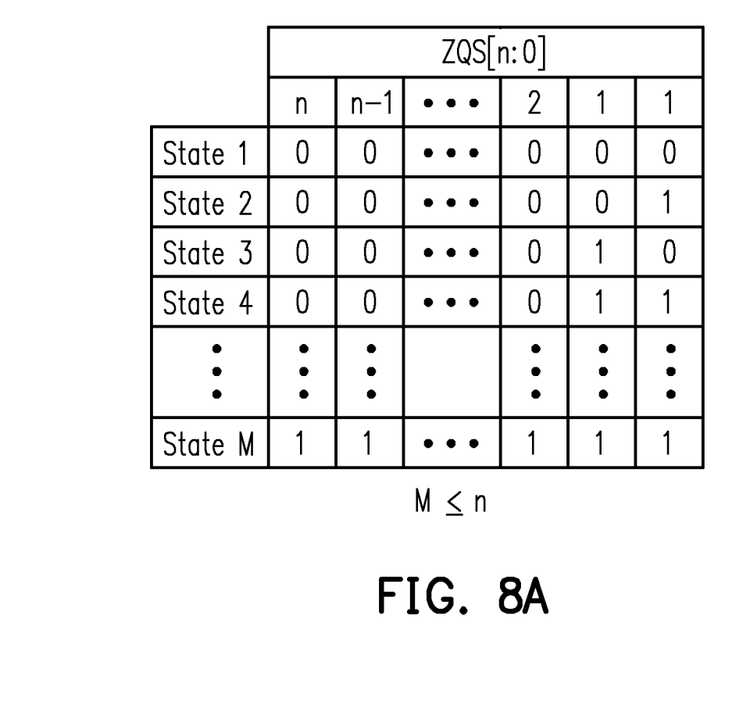
FIG. 8A and FIG. 8B respectively present schematic diagrams of each state corresponding to the calibration signal while a calibration controller uses linear search or binary search.
Figure 8B:
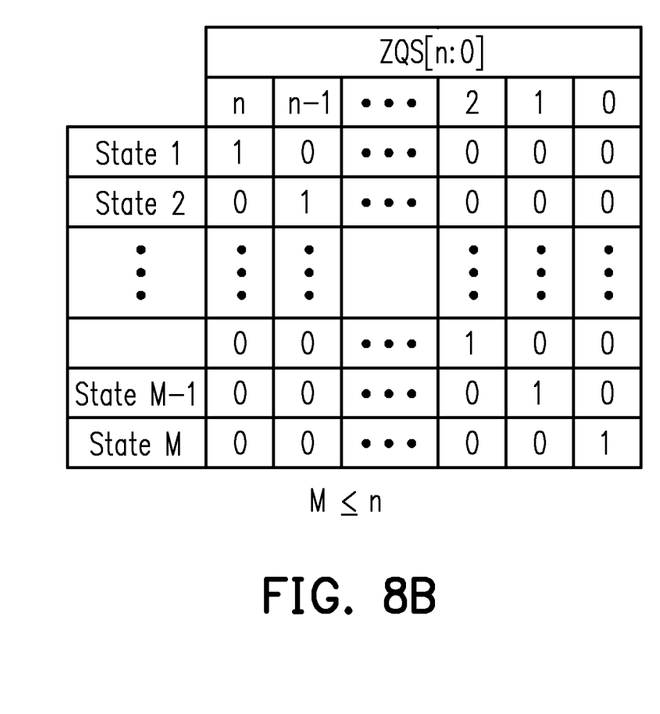
Figure 9:
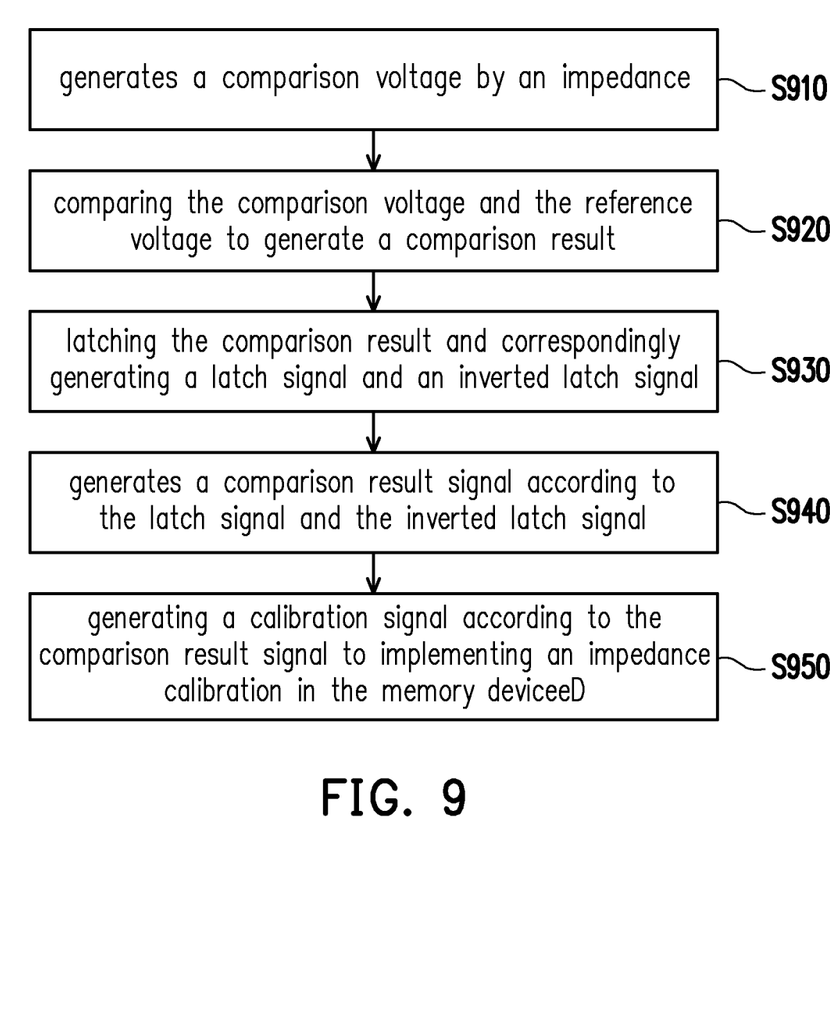
FIG. 9 is a flow chart of a calibration method of a memory device according to an embodiment of the present invention.

The calibration controller 240 of FIG. 2 and FIG. 4 can implement ZQ calibration in various ways. FIG. 8A and FIG. 8B respectively present schematic diagrams of each state corresponding to the calibration signal ZQS[n:0] while a calibration controller uses linear search or binary search, where n and M are positive integers, and M is less than or equal to n. Here, linear search corresponding to FIG. 8A or binary search corresponding to FIG. 8B are used as examples to illustrate that the ZQ calibration can have various implementations.

To sum up, the calibration apparatus of the memory device according to the embodiment of the disclosure reduces the delay time in comparing the comparison signal and the reference signal by changing the circuit structure (for example, replacement of the original comparison circuit with a strong-arm comparator, structural adjustment of the logic circuit) to allow subsequent circuits for impedance calibration (such as a controller that implements ZQ calibration) to have sufficient timing budget and calculation margin, thereby reducing the error rate of impedance calibration and improving the signal integrity in the memory device.

What is claimed is:

1. A calibration apparatus of a memory device, comprising:
   an impedance, configured to generate a comparison voltage;
   a strong-arm comparator, comprising:
      a non-inverting input received a reference voltage;
      an inverting input end received the comparison voltage, the strong-arm comparator compares the reference voltage and the comparison voltage to generate a differential comparison result, latches the differential comparison result and correspondingly generates a latch signal and an inverted latch signal;
      a first output terminal, outputting the latch signal; and
      a second output terminal, outputting the inverted latch signal;
   a logic circuit, coupled to the strong-arm comparator to generate a comparison result signal according to the latch signal and the inverted latch signal; and
   a calibration controller, wherein the calibration controller implements an impedance calibration in the memory device according to the comparison result signal,
   wherein the logic circuit comprises:
      a logic subcircuit, wherein a first input terminal of the logic subcircuit is coupled to the first output terminal of the strong-arm comparator, a second input terminal of the logic subcircuit is coupled to the second output terminal of the strong-arm comparator, and an output terminal of the logic subcircuit generates a clock signal; and
      a data flip-flop comprises a data input terminal, a clock receiving terminal and a data output terminal, wherein the first output terminal of the strong-arm comparator is coupled to the data input terminal, the output terminal of the logic subcircuit is coupled to the clock receiving terminal, and the data flip-flop generates the comparison result signal at the data output terminal according to the latch signal and the clock signal generated by the logic subcircuit.

2. The calibration apparatus according to claim 1, wherein the logic subcircuit comprises a NAND gate,
   wherein a first input end of the NAND gate receives the latch signal, a second input end of the NAND gate receives the inverted latch signal, and an output end of the NAND gate is coupled to an output end of the logic subcircuit.

3. The calibration apparatus according to claim 2, wherein the clock signal is enabled to trigger the data flip-flop, in response to a polarity of the latch signal or the inverted latch signal being reversed.

4. The calibration apparatus according to claim 1, wherein the strong-arm comparator comprises:
   a differential input pair, comprising a first input end and a second input end, the first input end serves as the non-inverting input end of the strong-arm comparator to receive the reference voltage, the second input end serves as the inverting input end of the strong-arm comparator to receive the comparison voltage, the differential input pair compares the reference voltage and the comparison voltage to generate the differential comparison result; and
   a latch, coupled to the differential input pair to latch the differential comparison result and to correspondingly generate the latch signal and the inverted latch signal.

5. The calibration apparatus according to claim 4, wherein the differential input pair comprises:
   a first transistor, wherein a control end of the first transistor is coupled to the non- inverting input end of the strong-arm comparator, and a first end of the first transistor serves as a first output end of the differential input pair; and
   a second transistor, wherein a control end of the second transistor is coupled to the inverting input end of the strong-arm comparator, and a first end of the second transistor serves as a second output end of the differential input pair, and a second end of the first transistor is coupled to a second end of the second transistor.

6. The calibration apparatus according to claim 5, wherein the differential input pair further comprises:
   a control transistor, wherein a first end of the control transistor is coupled to the second end of the first transistor and the second end of the second transistor, and a control end of the control transistor receives a clock signal; and
   a current source, coupled to a second end of the control transistor.

7. The calibration apparatus according to claim 4, wherein the latch comprises:
   a first inverter, wherein an input end of the first inverter is coupled to the first output end of the strong-arm comparator, an output end of the first inverter is coupled to the second output end of the strong-arm comparator, a ground end of the first inverter is coupled to a second output end of the differential input pair; and
   a second inverter, wherein an input end of the second inverter is coupled to the second output end of the strong-arm comparator, an output end of the second inverter is coupled to the first output end of the strong-arm comparator, and a ground end of the second inverter is coupled to a first output end of the differential input pair,
   wherein the first output end and the second output end of the strong-arm comparator are configured to generate the latch signal and the inverted latch signal respectively.

8. The calibration apparatus according to claim 7, wherein the first inverter comprises:
   a third transistor, wherein a control end of the third transistor is coupled to the first output end of the strong-arm comparator, a first end of the third transistor is coupled to the second output end of the strong-arm comparator, and a second end of the third transistor is coupled to the second output end of the differential input pair; and
   a fourth transistor, wherein a control end of the fourth transistor is coupled to the first output end of the strong-arm comparator, a first end of the fourth transistor is coupled to a system voltage end, and a second end of the fourth transistor is coupled to the second output end of the strong-arm comparator.

9. The calibration apparatus according to claim 7, wherein the second inverter comprises:
   a fifth transistor, wherein a control end of the fifth transistor is coupled to the second output end of the strong-arm comparator, a first end of the fifth transistor is coupled to the first output end of the strong-arm comparator, and a second end of the fifth transistor is coupled to the first output end of the differential input pair; and a sixth transistor, wherein a control end of the sixth transistor is coupled to the second output end of the strong-arm comparator, a first end of the sixth transistor is coupled to the system voltage end, and a second end of the sixth transistor is coupled to the first output end of the strong-arm comparator.

10. The calibration apparatus according to claim 4, wherein the strong-arm comparator further comprises:

a reset circuit, coupled to the differential input pair and the latch, wherein the rest circuit resets a first output end and a second output end of the differential input pair and resets the latch according to a clock signal.

11. The calibration apparatus according to claim 10, wherein the reset circuit comprises:

a seventh transistor, wherein a control end of the seventh transistor receives the clock signal, a first end of the seventh transistor is coupled to a system voltage end, and a second end of the seventh transistor is coupled to a first output end of the strong-arm comparator;

an eighth transistor, wherein a control end of the eighth transistor receives the clock signal, a first end of the eighth transistor is coupled to the system voltage end, and a second end of the eighth transistor is coupled to the first output end of the differential input pair;

a ninth transistor, wherein a control end of the ninth transistor receives the clock signal, a first end of the ninth transistor is coupled to the system voltage end, and a second end of the ninth transistor is coupled to a second output end of the strong-arm comparator; and a tenth transistor, wherein a control end of the tenth transistor receives the clock signal, a first end of the tenth transistor is coupled to the system voltage end, and a second end of the tenth transistor is coupled to the second output end of the differential input pair.

12. The calibration apparatus according to claim 1, further comprising:

an adjustment driver, being coupled to the impedance, wherein the impedance generates the comparison voltage through an adjusted current generated by the adjustment driver.

13. The calibration apparatus according to claim 12, wherein the calibration controller generates a calibration signal according to the comparison result signal to implement the impedance calibration, and the adjustment driver is controlled by the calibration signal to generate the adjusted current.

14. The calibration apparatus according to claim 1, further comprising:

a preamplifier, coupled between the strong-arm comparator and the impedance, wherein the non-inverting input end of the strong-arm comparator receives the reference voltage through the preamplifier, and the inverting input end of the strong-arm comparator receives the comparison voltage through the preamplifier, wherein the preamplifier is configured to amplify a voltage difference between the reference voltage and the comparison voltage.

15. The calibration apparatus according to claim 1, wherein the impedance calibration is a ZQ calibration, and the calibration controller uses a linear search or a binary search to implement the ZQ calibration.

16. A calibration method of a memory device, comprising:

generating a comparison voltage according to an impedance;

comparing the comparison voltage and a reference voltage to generate a differential comparison result based on a strong-arm comparator;

latching the differential comparison result and correspondingly generating a latch signal and an inverted latch signal;

generating a comparison result signal according to the latch signal and the inverted latch signal; and generating a calibration signal according to the comparison result signal to implement impedance calibration of the memory device, wherein a step for generating the comparison result signal according to the latch signal and the inverted latch signal comprises:

generating a clock signal according to the latch signal and the inverted latch signal by a logic subcircuit, wherein a first input end of the logic subcircuit is coupled to a first output end of the strong-arm comparator, a second input end of the logic subcircuit is coupled to a second output end of the strong-arm comparator, and an output terminal of the logic subcircuit generates the clock signal; and generating the comparison result signal according to the latch signal, the inverted latch signal and the clock signal by a data flip-flop, wherein the clock signal is enabled to trigger the data flip-flop, in response to a polarity of the latch signal or the inverted latch signal being reversed.

17. The calibration method according to claim 16, the logic subcircuit comprises a NAND gate, wherein a first input end of the NAND gate receives the latch signal, a second input end of the NAND gate receives the inverted latch signal, and an output end of the NAND gate is coupled to an output end of the logic subcircuit.

18. The calibration method according to claim 16, a step of generating the comparison voltage according to the impedance comprising:

generating an adjusted current according to the calibration signal by an adjustment driver to generate the comparison voltage with the impedance.

19. The calibration method according to claim 16, further comprising:

amplifying a voltage difference between the reference voltage and the comparison voltage by a preamplifier.

20. The calibration method according to claim 16, wherein the impedance calibration is a ZQ calibration, and an implementation of the ZQ calibration uses a linear search or a binary search.

* * * * *